Aug. 14, 1928.
C. H. PORTER
1,681,047
GAS ANALYSIS APPARATUS
Filed Oct. 11, 1924
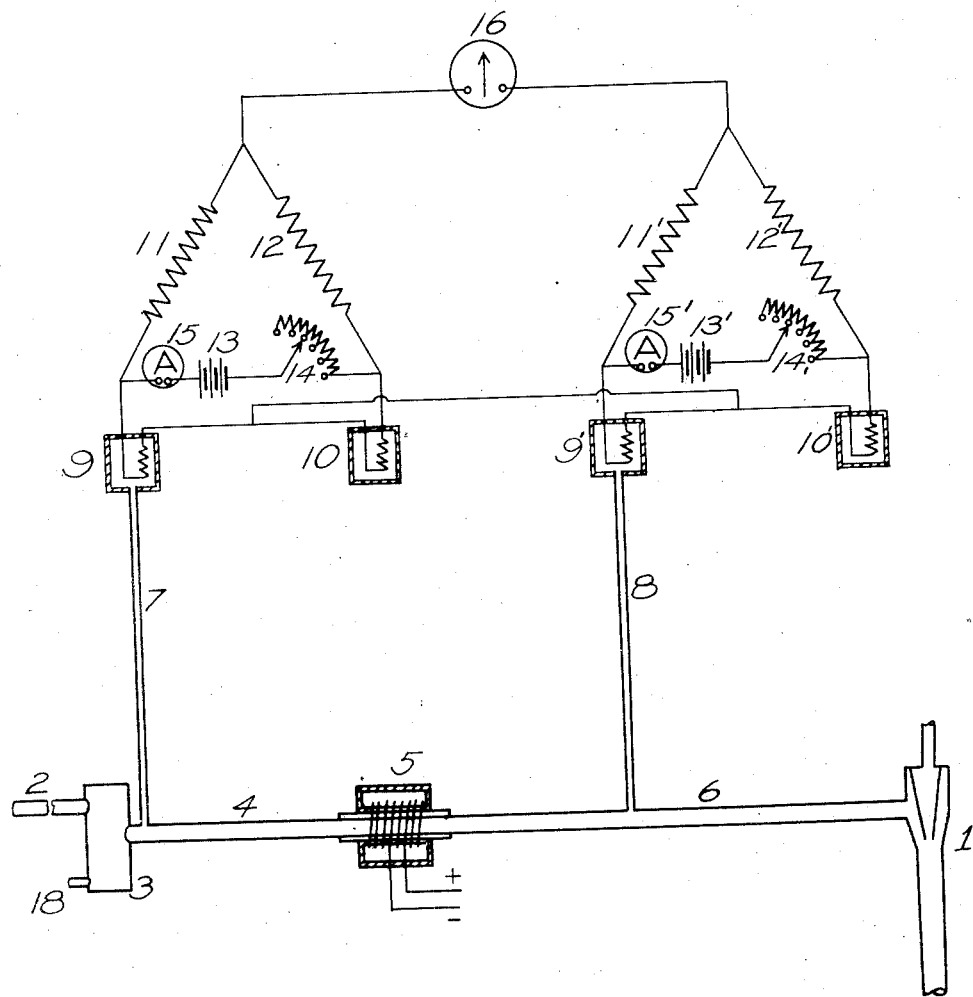
Inventor;
Clarence H. Porter Patented Aug. 14, 1928.

1,681,047

UNITED STATES PATENT OFFICE.

CLARENCE H. PORTER, OF WASHINGTON, DISTRICT OF COLUMBIA.

GAS-ANALYSIS APPARATUS.

Application filed October 11, 1924. Serial No. 743,114.

My invention relates to improvements in gas analysis apparatus of the electric type, and the object of my improvement is to provide a continuous record or indication of the amount of unburned combustible in a gas such as flue gas.

I attain this object by the mechanism illustrated in the accompanying drawing.

The aspirator 1 continuously draws a supply of the gas to be analyzed through the sampling tube 2, and a supply of air through the air inlet 18 into the filter 3. Filter 3, provided with pipe connections to the sampling tube 2, the air inlet 18, and the tube 4, contains any suitable absorbent or filtering material such as felt. Flue gas enters through the sampling tube 2, and air through the air inlet 18. The filtering material removes any dirt particles from the mixture before it passes into tube 4. The mixture is then drawn through the tube 4 to the burner 5 where combustion is carried to completion. In the present instance burner 5 is shown as a small electric furnace of the resistance type.

The burned sample of gas is then drawn through the tube 6, then through the aspirator, and is discharged into the waste.

From tube 4 a small branch tube 7 (shown diagrammatically and of an exaggerated length) leads to an electric $CO_2$ analyzing apparatus, and from tube 6 a similar branch tube 8 leads to a second electric $CO_2$ analyzing apparatus. In the present instance the two units of electric $CO_2$ analyzing apparatus are identical, each operating on the principle of the different thermal conductivity of $CO_2$ and of air, in the manner described in Technological Paper No. 249 of the Bureau of Standards. Since the units are identical, only one will be described. Corresponding elements in the second analyzing unit are indicated by "primes" in the drawing.

The electric $CO_2$ analyzing unit consists of two identical resistance elements each enclosed in a casing so as to form two cells 9 and 10, also two other fixed resistances 11 and 12, the four resistances forming the four arms of a Wheatstone bridge circuit. Cell 9 is connected by means of the tube 7 to the gas supply tube 4, so that the resistance element in cell 9 is surrounded by gas diffused through tube 7 from the unburned sample. Cell 10 contains air and is sealed. In the second electric $CO_2$ analyzing unit, cell 9' is connected by means of tube 8 to tube 6 which contains the burned sample of gas, and thus the resistance element in this second cell 9 is surrounded by gas diffused through the tube 8 from the burned sample.

The current in the Wheatstone bridge circuit is supplied by the battery 13, and is adjusted by means of the rheostat 14. The ammeter 15 indicates the value of the current, which should be kept constant.

The Wheatstone bridges of the two $CO_2$ analyzing units are opposingly connected to each other, the galvanometric indicator or recorder 16 forming part of the connecting circuit. The galvanometric indicator or recorder 16 is thus subjected to the opposing electrical forces of the two Wheatstone bridges.

The Wheatstone bridge circuit of each of the $CO_2$ analyzing units is balanced when there is no $CO_2$ present in cell 9. The presence of $CO_2$ in the sample causes the gas cell 9 of each of the $CO_2$ analyzing units to contain some $CO_2$. Since $CO_2$ has a lower rate of thermal conductivity than air, the heat generated in the resistance element of cell 9 will be conducted away less rapidly than the heat generated in the similar resistance element in cell 10, which contains air. Therefore the resistance element in cell 9 will attain a higher temperature than that in cell 10. Since the specific resistance of the resistance element increases with an increase in temperature, the total resistance of the resistance element in cell 9 becomes greater than that of the similar element in cell 10, and therefore current in cell 9 becomes less than the current in cell 10. This causes the Wheatstone bridge circuit to become unbalanced.

There is more $CO_2$ in the gas sample after it has passed through the burner 5 than before. The second Wheatstone bridge circuit will therefore be more unbalanced than the first Wheatstone bridge circuit. Since the two Wheatstone bridge circuits are connected so as to oppose one another in their effect on the galvanometric indicator or recorder 16, this indicator or recorder will read in terms of the difference of $CO_2$ content between the analysis of the first $CO_2$ analysis unit and that of the second $CO_2$ analysis unit. The galvanometric indicator or recorder 16 will thus show the increase in $CO_2$ content due to burning of combustible in the gas sample. The galvanometric indicator or recorder 16 may be calibrated to read in percent of unburned combustible in the sample.

The function of the air inlet 18 is to admit air to the sample so that the sample is diluted with air in a definite ratio which may be adjusted. This dilution of the sample causes better combustion in the burner 5. It is necessary to calibrate the whole apparatus to read in percent of the original undiluted sample. After calibration, the ratio of air to gas is not changed.

The two $CO_2$ analyzing units operating on the principle of the different thermal conductivities of $CO_2$ and air have been described because they are of a very satisfactory type. Any other type of electric $CO_2$ analyzing apparatus may be used to carry out the objects of my improvement, and may be connected so as to differentially actuate the galvanometric indicator or recorder 16, instead of the two electric $CO_2$ analyzing units described above. The galvanometric indicator or recorder 16 may be calibrated to read in percent CO if that gas is the main constituent of the unburned combustible of the sample.

I claim:

1. In a gas analysis apparatus, electrical means responsive to the thermal conductivity of a gas sample, means adapted to cause combustion of the sample, second electrical means responsive to the thermal conductivity of the burned gas, and a single galvanometer adapted to be actuated by the combined effects of both said electrical means.

2. In combination, electrical means including an electrical bridge adapted to respond to changes in the thermal conductivity of a sample of gas, means adapted to cause a change in the chemical composition of the said sample of gas, second electrical means including an electrical bridge adapted to respond to changes in the thermal conductivity of the altered gas sample, and a galvanometer adapted to be actuated by the combined electrical effects of the two said electrical bridges.

CLARENCE H. PORTER.